United States Patent [19]

Stille

[11] Patent Number: 4,852,721

[45] Date of Patent: Aug. 1, 1989

[54] BALL-TYPE CONVEYOR

[75] Inventor: Volker Stille, Baunatal, Fed. Rep. of Germany

[73] Assignee: Lödige Fördertechnik GmbH, Friedrich-Böhlen-Str., Fed. Rep. of Germany

[21] Appl. No.: 101,683

[22] Filed: Sep. 28, 1987

[30] Foreign Application Priority Data

Oct. 30, 1986 [DE] Fed. Rep. of Germany ....... 3637003

[51] Int. Cl.$^4$ ............................................. B65G 13/02
[52] U.S. Cl. .................................... 198/782; 198/586; 198/789
[58] Field of Search ............... 198/782, 586, 789, 456, 198/412, 457; 193/35 MD, 35 C

[56] References Cited

U.S. PATENT DOCUMENTS

| | | | |
|---|---|---|---|
| 3,580,379 | 5/1971 | Shuster et al. | 198/412 X |
| 3,621,973 | 11/1971 | Carlson et al. | 198/456 |
| 3,679,043 | 7/1972 | Becker | 198/457 X |
| 3,828,917 | 8/1974 | Oestergen | 198/457 X |
| 4,681,211 | 7/1987 | Lödige et al. | 198/789 |

Primary Examiner—Robert J. Spar
Assistant Examiner—Cheryl L. Gastineau
Attorney, Agent, or Firm—Charles E. Baxley

[57] ABSTRACT

A ball-type conveyor has a stationary support frame and a plate on the support frame formed with a plurality of generally parallel rows of holes extending transversely of a longitudinal transport direction. Underneath each row of balls is a respective shaft that is journaled in the support frame for rotation about a respective transverse axis. Respective balls in the holes project upward through the holes beyond the plate and downward through the respective holes into engagement with the shaft of the respective row. The shafts can be rotated about the respective axes so as to rotate the balls to displace an object resting on the balls in the longitudinal transport direction. The conveyor has a guide for displacement of the plate and the balls transversely but not longitudinally of the direction through a predetermined transverse distance relative to the shafts and frame. An actuator is operatively connected between the plate and the frame for transversely displacing the plate and balls through the distance relative to the shafts and frame.

11 Claims, 5 Drawing Sheets

BALL-TYPE CONVEYOR

FIELD OF THE INVENTION

The present invention relates to a ball-type conveyor. More particularly this invention concerns such a conveyor which moves an object on an array of rotating balls.

BACKGROUND OF THE INVENTION

A standard ball-type conveyor such as described in U.S. Pat. No. 4,681,221, issued July 21, 1987, has a stationary support frame and a plate on the support frame formed with a plurality of generally parallel rows of holes extending transversely of a longitudinal transport direction. Underneath each row of balls is a respective shaft that is journaled in the support frame for rotation about a respective transverse axis. Balls in the holes each project upward through the respective hole beyond the plate and downward through the respective hole into engagement with the shaft of the respective row. The shafts can be rotated about the respective axes so as to rotate the balls to displace an object resting on the balls in the longitudinal transport direction.

Such a conveyor has certain advantages over a standard roller conveyor because it supports the load at a plurality of longitudinally and transversely spaced points rather than at a plurality of longitudinally spaced lines. The main difficulty with such devices is, however, that they cannot be used to align the object being conveyed with the longitudinal direction. When, for instance, a heavy object is laterally offset or skewed to the longitudinal direction so that it could catch on the edge of a passthrough opening, it is necessary to laboriously lift the object and reposition it, something that is impossible with large objects like air-freight containers. When the object is large a special orienting crane must be employed.

It has been suggested in German patent document No. 2,261,936 to support the balls not on cylindrical shafts but on flat support surfaces that can be moved somewhat transversely as well as longitudinally. The resultant equipment does allow some degree of position adjustment of the object being conveyed, but is extremely complex and expensive to manufacture and maintain. While it is possible to rotate the object being conveyed through as much as 90°, the cost of the equipment is so great as to preclude its widespread use.

In another arrangement a short run of the conveyor can be displaced transversely of a straight-motion takeoff conveyor. This makes it possible to swing the conveyor to one side or the other from a longitudinal centerline so as to allow a canted object to be deposited on the takeoff conveyor extending perfectly longitudinal. Such a piece of equipment needs considerable floor space, making it impossible to use it in an arrangement where the conveyor is sunk in the floor, and as a result of the side-to-side action this equipment is extremely hazardous for operating personnel who might get caught between the device and adjacent equipment.

OBJECTS OF THE INVENTION

It is therefore an object of the present invention to provide an improved ball-type conveyor.

Another object is the provision of such a ball-type conveyor which overcomes the above-given disadvantages, that is which is of simple and inexpensive construction, but which nonetheless allows the position of an object being conveyed to be adjusted transversely.

SUMMARY OF THE INVENTION

The conveyor according to this invention has a guide for displacement of the plate and the balls transversely but not longitudinally of the direction through a predetermined transverse distance relative to the shafts and frame. An actuator is operatively connected between the plate and the frame for transversely displacing the plate and balls through the distance relative to the shafts and frame.

The construction of this correcting-type ball conveyor is therefore very simple. Due to the transmission of the transverse displacement to the balls, the object being conveyed will be displaced transversely through a distance equal to the double of the transverse displacement of the ball plate. Thus in an arrangement wherein the plate can be moved 100 mm to either side of a center position, it is possible to achieve a full 400 mm transverse travel of the conveyed object, an amount sufficient to compensate for any normally encountered offcenter position.

According to this invention the frame is transversely wider than the plate and the plate can slide transversely on the frame. To this end the longitudinal beams have inwardly projecting flanges on which the plate rests. In addition the guide is a beam extending perpendicular to the direction underneath the plate and the plate rests on an upper surface of the beam. Normally this beam is central, although it is of course possible to use two or more symmetrically arrayed beams. The plate of this invention is provided with followers flanking the guide beam, these followers normally being rollers rotatable about axes perpendicular to the plate and engaging the beam in the direction.

The actuator of this invention is attached to the plate at a location midway between upstream and downstream ends of the plate and can be a fluid-powered cylinder or a motor and threaded spindle releasably connected to the plate.

To align an object parallel to the direction the plate can have an upstream section and an independent downstream section. Each section is provided with respective guide and control means.

DESCRIPTION OF THE DRAWING

The above and other features and advantage will become more readily apparent from the following, reference being made to the accompanying drawing in which.

SPECIFIC DESCRIPTION

Figure 1:
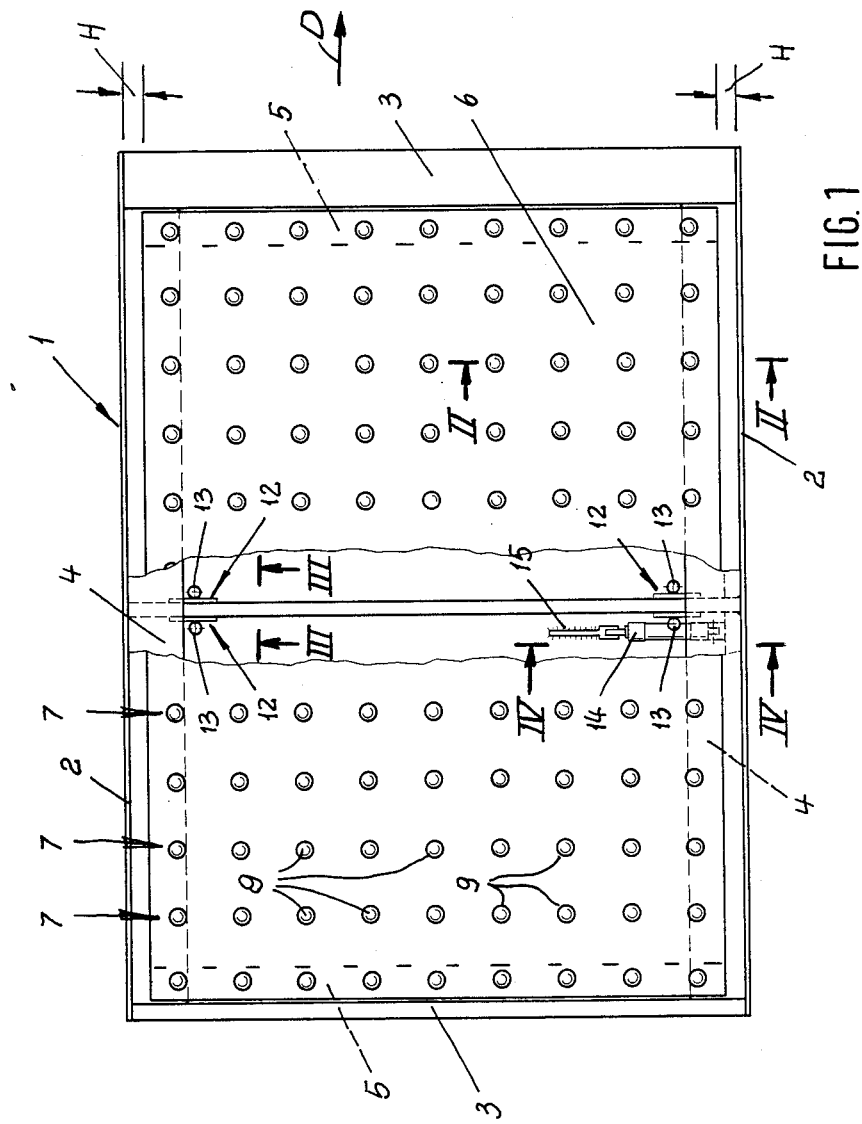
FIG. 1 is a small-scale top view of the transfer conveyor according to this invention.

As seen in FIG. 1 a transfer conveyor 1 according to this invention has a horizontal and rectangular frame 2, 3 formed by longitudinal angle beams 2 and transverse angle beams 3 having respective horizontal support flanges 4 and 5. A plate 6 rests on these flanges 4 and 5 and has a transverse width which is narrower by a distance 2H than the distance between the upright flanges of the longitudinal beams 2 so that this plate 6 can move transversely through a distance H.

Figure 2:
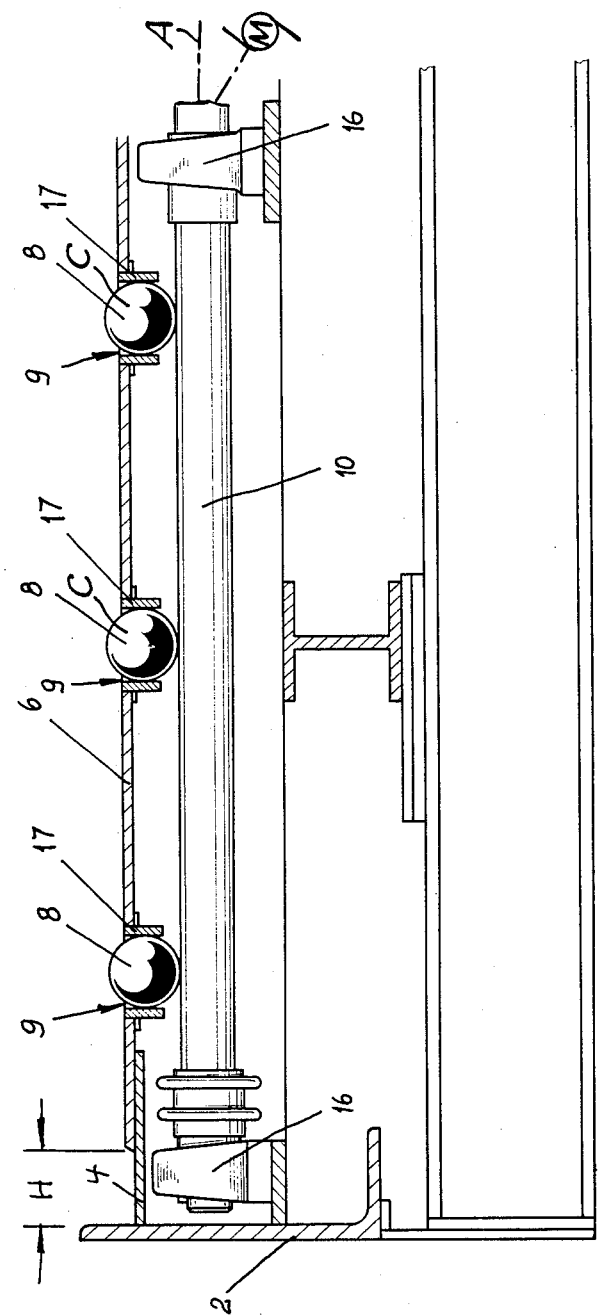
FIGS. 2, 3, and 4 are large-scale cross, longitudinal, and cross sections, respectively, through the conveyor of FIG. 1.
Figure 3:
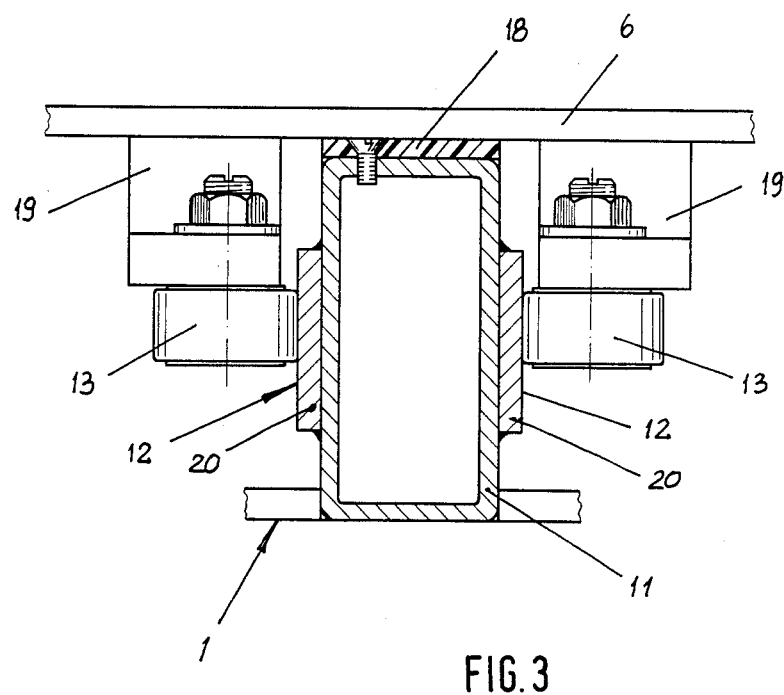
Figure 4:
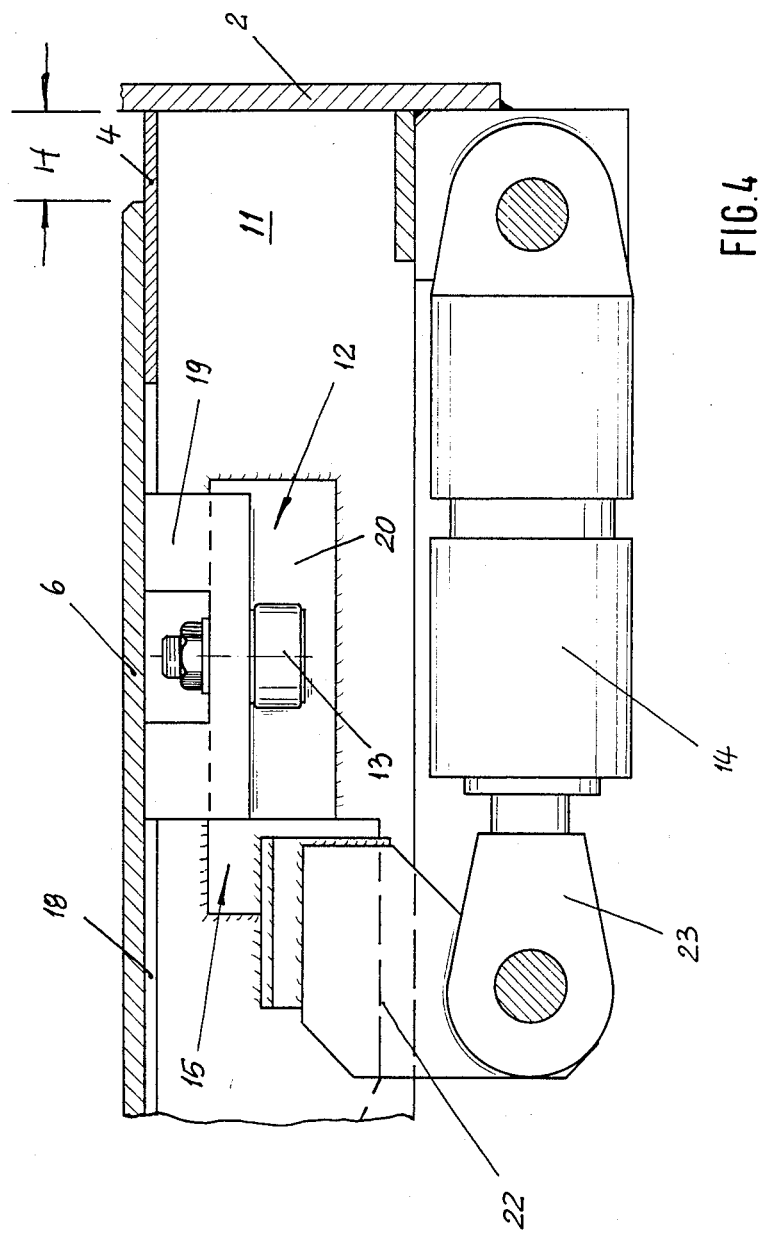

The plate 6 is formed with longitudinally equispaced rows 7 of vertically throughgoing holes 9 receiving respective support balls 8 normally made of steel. As seen in FIG. 2 each hole 9 is fitted with a respective guide bushing 17 permitting the respective ball 8 to turn freely about its center C. Underneath each row 7 of balls 8 the table has a drive shaft 10 set in pillow blocks 16 and driven by a motor M to rotate about its axis A and thereby displace an object supported on the balls 8 in a longitudinal transport direction D (FIG. 1) parallel to the beams 2.

To prevent the plate 6 from moving in the direction D and to keep the ball centers C directly over the axes A of the respective shafts 10, the longitudinal frame members 2 are bridged by a rectangular-section guide beam 11 extending perpendicular to the direction D and having an upper surface provided with a slide layer 18 of a material like polytetrafluoroethylene having a low coefficient of surface friction. The sides of this beam 11 facing upstream and downstream perpendicular to the direction D are provided with rails 20 having vertical outer surfaces 12 that are planar and perpendicular to the direction D. The plate 6 is provided adjacent each of its longitudinal edges with a pair of mounts 19 flanking the rail 11 and is provided with rollers 13 rotatable about vertical axes and engaging the rail surfaces 12. Thus the plate 6 can move perpendicular to the direction D in either direction through the distance H from the illustrated center position, for a total transverse travel of 2H.

A double-acting hydraulic cylinder 14 is pivoted at one end about an axis parallel to the direction D on one of the longitudinal frame members 2 and has a piston rod 23 pivoted about a parallel axis on a tab 22 fixed to one of the mounts 19 or otherwise secured to the plate 6. Thus expansion or contraction of this actuator 14 will laterally displace the plate 6.

Under normal circumstances the plate 6 is in the illustrated central position and the motor M rotates all the shafts 10 to in turn rotate all the balls 8 about their centers C and thereby displace an object in the direction D. When, however, sensors like photocells upstream and downstream of the plate 6 detect that the object on the balls 8 is too far to one side or the other, the actuator 14 is appropriately operated to shift the plate 6 such that this offcenter object is moved toward the center. A shift of the plate 6 in one transverse direction through the distance H will shift the object through twice this distance. Clearly if a substantial correction is needed several such conveyors can be cascaded.

Figure 5:
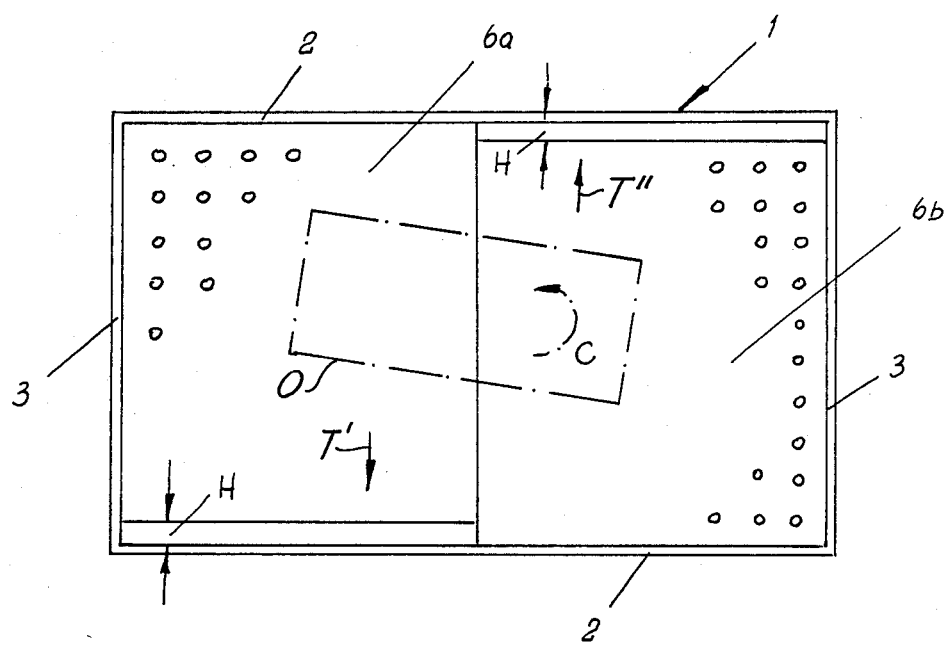
FIG. 5 is a view like FIG. 1 showing an alternative arrangement according to the present invention.

FIG. 5 shows an arrangement identical to that of FIG. 1 except that it has two plates 6a and 6b. Each such plate 6a and 6b is provided with a separate guide beam 11 and actuator 14 and is only narrower by the distance H than the transverse width between the vertical flanges side beams 2. Such an arrangement is useful for aligning an object such as shown at O which is not extending parallel to the longitudinal direction D. To this end the one plate 6a is shifted transversely to the right in direction T' and the other to the left in direction T" so as to rotate the object O, which is at this time bridging the two plates 6a and 6b, as illustrated by arrow C. Such correction is completely impossible with all currently known conveyors.

Thus with the system of this invention an advanced ball-type conveyor can be used for laterally positioning and aligning an object being conveyed. The overall width of this correcting conveyor is virtually the same as a standard noncorrecting device, and the equipment is scarcely more complicated or expensive to manufacture.

What is claimed is:

1. A conveyor comprising:
   a stationary support frame;
   a plate on the support frame formed with a plurality of generally parallel rows of holes extending transversely of a longitudinal transport direction;
   a respective shaft underneath and substantially parallel to each row of holes, the shafts being journaled in the support frame for rotation about respective transverse axes;
   respective balls in the holes each projecting upward through the respective hole beyond the plate and downward through the respective hole into engagement with the shaft of the respective row;
   means for rotating the shafts about the respective axes and thereby rotating the balls to displace an object resting on the balls in the longitudinal transport direction;
   means including a guide for displacement of the plate and the balls transversely but not longitudinally of the direction through a predetermined transverse distance relative to the shafts and frame; and
   control means for transversely displacing the plate and balls through the distance relative to the shafts and frame.

2. The conveyor defined in claim 1 wherein the frame is transversely wider than the plate and the plate can slide transversely on the frame.

3. The conveyor defined in claim 1 wherein the guide is a beam extending perpendicular to the direction underneath the plate, the plate resting on an upper surface of the beam.

4. A conveyor comprising:
   a stationary support frame;
   a plate on the support frame formed with a plurality of generally parallel rows of holes extending transversely of a longitudinal transport direction;
   a respective shaft underneath and substantially parallel to each row of holes, the shafts being journaled in the support frame for rotation about respective transverse axes;
   respective balls in the holes in each projecting upward through the respective hole beyond the plate and downward through the respective hole into engagement with the shaft of the respective row;
   means for rotating the shafts about the respective axes and thereby rotating the balls to displace an object resting on the ball in the longitudinal transport direction;
   means including a guide for displacement of the plate and the balls transversely but not longitudinally of the direction through a predetermined transverse distance relative to the shafts and frame; and
   control means for transversely displacing the plate and balls through the distance relative to the shafts and frame, wherein the guide is a beam extending perpendicular to the direction underneath the plate, the plate resting on an upper surface of the beam, and wherein the plate is provided with followers flanking the guide beam.

5. The conveyor defined in claim 4 wherein the followers are rollers rotatable about axes perpendicular to the plate and engaging the beam in the direction.

6. The conveyor defined in claim 1 wherein the control means includes an actuator operatively connected between the plate and the frame.

7. The conveyor defined in claim 6 wherein the actuator is generally attached to the plate at a location midway between upstream and downstream ends of the plate.

8. The conveyor defined in claim 6 wherein the actuator is a fluid-powered cylinder.

9. The conveyor defined in claim 6 wherein the actuator is releasably connected to the plate.

10. The conveyor defined in claim 1 wherein the plate has an upstream section and an independent downstream section, each section being provided with respective guide and control means.

11. A conveyor comprising:
   a stationary support frame;
   a plate on the support frame having an upstream section and an independent downstream section, both sections being formed with a plurality of generally parallel rows of holes extending transversely of a longitudinal transport direction;
   a respective shaft underneath and substantially parallel to each row of holes, the shafts being journaled in the support frame for rotation about respective transverse axes;
   respective balls in the holes each projecting upward through the respective hole beyond the respective plate section and downward through the respective hole into engagement with the shaft of the respective row;
   means for rotating the shafts about the respective axes and thereby rotating the balls to displace a object resting on the balls in the longitudinal transport direction;
   means including respective upstream and downstream guides for displacement of the plate sections and the balls transversely but not longitudinally of the direction through a predetermined transverse distance relative to the shafts and frame, the plate sections being independently transversely displaceable; and
   control means including respective upstream and downstream actuators engaged between the respective plate sections and the frame for transversely displacing the plate sections and balls through the distance relative to the shafts and frame, whereby an object being conveyed that is bridging the two sections can be twisted about an upright axis by opposite displacement of the two sections.

* * * * *